United States Patent [19]

Kline

[11] 4,362,887
[45] Dec. 7, 1982

[54] SYNERGISTIC ANTIOXIDANT MIXTURES

[75] Inventor: Richard H. Kline, Silver Lake, Ohio

[73] Assignee: The Goodyear Tire & Rubber Company, Akron, Ohio

[21] Appl. No.: 252,778

[22] Filed: Apr. 10, 1981

[51] Int. Cl.$^3$ ............... C07C 149/40; C07C 149/26; C07C 149/20
[52] U.S. Cl. ................. 560/152; 560/15; 560/17; 560/121; 560/125; 252/404
[58] Field of Search ............ 560/15, 152, 1, 17, 560/121, 125; 260/45, 85 H

[56] References Cited

U.S. PATENT DOCUMENTS

| | | | |
|---|---|---|---|
| 2,468,725 | 5/1949 | Gresham | 560/15 |
| 3,637,809 | 1/1972 | Kleiner | 560/15 |
| 3,789,064 | 1/1974 | Hechenbleikner | 560/15 |
| 3,954,839 | 5/1976 | Dexter | 560/75 |
| 4,080,364 | 3/1978 | Kander | 560/15 |
| 4,226,991 | 10/1980 | Nakahara | 560/152 |
| 4,301,296 | 11/1981 | Kuczkowski | 560/152 |

FOREIGN PATENT DOCUMENTS 891391 8/1953 Fed. Rep. of Germany ...... 560/152

OTHER PUBLICATIONS

Reid, "Organic Chemistry of Bivalent Sulfur", vol. III, pp. 185, 186, 187, 193, 194 and 227–249, (1960).
Kuliev, Chem. Abst. 79:115348t, (1973).
Allinger, "Organic Chem.", pp. 528–530, (1971).

Primary Examiner—Michael L. Shippen
Attorney, Agent, or Firm—D. O. Nickey

[57] ABSTRACT

Compounds of the formula:

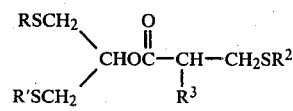

wherein R, R' and R$^2$ are alkyl radicals having 1 to 20 carbon atoms, phenyl radicals which may be substituted by 1 or 2 alkyl groups having 1 to 8 carbon atoms, aralkyl radicals having 7 to 12 carbon atoms, or cycloalkyl radicals having 5 to 12 carbon atoms; and wherein R$^3$ is hydrogen or an alkyl radical having from 1 to 4 carbon atoms. These compounds have utility as synergistic stabilizers with phenolic type antioxidants for the stabilization of organic materials such as natural and synthetic polymers, rubbers, lubricants and oils, etc.

5 Claims, No Drawings

SYNERGISTIC ANTIOXIDANT MIXTURES

TECHNICAL FIELD

This invention relates to an antioxidant system. More particularly, it relates to organic compositions stabilized against oxidative degradation by a two component system consisting of a novel compound and a phenolic antioxidant.

BACKGROUND ART

It is well-known that such organic materials as plastics, rubbers, lubricating oils, etc. are prone to oxidation and deterioration in the presence of oxygen. Oxidation of organic materials causes the loss of those intrinsic properties characteristic of the organic material. With a view to preventing deterioration a variety of antioxidants have been developed. However, these antioxidants fail to prevent completely the deterioration of the desired properties of the materials to which they are added. Thus, those skilled in the art are constantly searching for new and more effective antioxidant systems which are useful for the protection of polymers and other organic materials.

Antioxidant synergists have been known in the art for sometime. For example, U.S. Pat. No. 3,492,336 discloses a novel tetra-alkyl thioethyl thiodisuccinate compound for use with phenolic type antioxidants in the stabilization of polyolefins.

An antioxidant composition comprising a synergistic mixture of a phenol, an amine and a sulfone is described in U.S. Pat. No. 3,839,210. U.S. Pat. No. 3,398,116 discloses a thiocarboxylic acid thioether ester used in combination with a limited group of phenolic antioxidants to stabilize poly-α-olefins against oxidative degradation.

A synergistic, terpene based antioxidant system is disclosed in U.S. Pat. No. 3,491,044 in which a rosin alcohol ester of thiodipropinonic acid is used in combination with a tris-isobornyl phenol antioxidant to stabilize natural and synthetic polymers, rubber, lubricants and oils etc.

In addition, U.S. Pat. No. 3,758,549 discloses polyalkanol esters of alkylthio-alkanoic acids as synergists with phenolic antioxidants and U.S. Pat. Nos. 3,666,716 and 3,505,225 disclose dialkyl 3,3'-thiodipropionates as synergists with derivatives of diphenylamine and the phenylnaphthylamines.

The art of using a combination of antioxidants has already been put into practice in the industry and such antioxidant combinations are often highly effective. There has been prepared a variety of antioxidants which have been examined with a view toward obtaining more stable organic compositions. As a result it has been found that the combined use of the novel compounds of this invention and phenolic antioxidants brings about an unexpectedly powerful antioxidative effect. None of the above cited patents or other literature in the art has disclosed or even suggests the compounds which are used in the practice of this invention.

DISCLOSURE OF THE INVENTION

There is disclosed a composition comprising (a) organic material selected from the group of oxidizable polymers, oils, resins, waxes and fuel containing an effective amount of a mixture of (b) a phenolic antioxidant, and (c) a compound of the formula I:

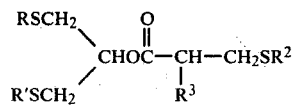

wherein R, R' and R² are alkyl radicals having 1 to 20 carbon atoms, phenyl radicals which may be substituted by 1 or 2 alkyl groups having 1 to 8 carbon atoms, aralkyl radicals having 7 to 12 carbon atoms or cycloalkyl radicals having 5 to 12 carbon atoms and R³ is hydrogen or an alkyl radical having 1 to 4 carbon atoms; the ratio of (c) to (b) ranging from 1 to 4 to 4 to 1.

There is also disclosed an antioxidant composition comprised of a phenolic antioxidant (b) and a compound (c) of general formula I:

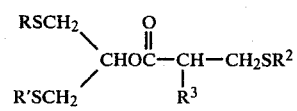

wherein R, R' and R² are alkyl radicals having 1 to 20 carbon atoms, phenyl radicals which may be substituted by 1 or 2 alkyl groups having 1 to 8 carbon atoms, aralkyl radicals having 7 to 12 carbon atoms or cycloalkyl radicals having 5 to 12 carbon atoms and R³ is hydrogen or an alkyl radical having 1 to 4 carbon atoms; the ratio of (c) to (b) ranging from 1 to 4 to 4 to 1.

In general formula I it is preferred that R and R' be dodecyl or phenyl and that R² is dodecyl. The compound of general formula I has exhibited synergistic effect with phenolic antioxidants of the type listed hereafter. However, it is contemplated that other antioxidants may exhibit synergism when used in combination with the compounds of general formula I.

The present invention also relates to the compounds expressed by general formula I and the process for the synthesis of compounds expressed by general formula I.

The compounds of this invention exhibit their novel properties when combined with the variety of stabilizers known as phenolics, many of which are commercially available and some of which are the subject of patents.

DETAILED DESCRIPTION OF INVENTION

Typical of the phenolic antioxidants with stabilizing properties that are improved by the addition of compounds of the present invention are phenolic compounds having the general formula (II):

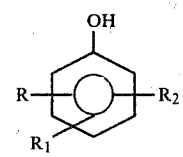

wherein R is a tertiary radical having from 4 to 8 carbon atoms, a cycloalkyl radical having 5 to 12 carbon atoms or an aralkyl radical having 7 to 12 carbon atoms and wherein R₁ and R₂ are alkyl radicals having 1 to 12 carbon atoms, cycloalkyl radicals having 5 to 12 carbon atoms or aralkyl radicals having from 7 to 12 carbon atoms, or the formula (III):

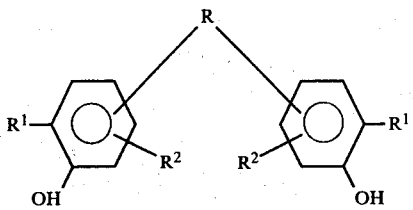

(III)

wherein R is an alkylidene radical having 1 to 4 carbon atoms, the group —O—, or the group —S—, and wherein $R^1$ and $R^2$ are alkyl radicals having 1 to 12 carbon atoms, cycloalkyl radicals having 5 to 12 carbon atoms, or aralkyl radicals having 7 to 12 carbon atoms. Preferably at least one of $R^1$ and $R^2$ is a tert.alkyl radical having 4 to 8 carbon atoms and is in a position ortho to the hydroxyl group, or the formula:

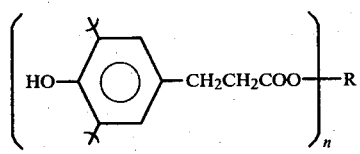

wherein ✗ is a tert.butyl radical and wherein n is an integer from 1 to 4 and R is an alkyl radical having 8 to 20 carbon atoms, an alkylene radical having 2 to 6 carbon atoms, a thiodialkylene radical wherein each alkylene radical has 2 to 6 carbon atoms, a trivalent radical derived from a straight or branched chain hydrocarbon having 3 to 8 carbon atoms, or a tetravalent radical derived from a straight or branched chain hydrocarbon having 5 to 8 carbon atoms.

Typical phenolic antioxidants applicable in the present invention include:
2,6-di-tert.butyl-4-methylphenol
2,4,6-tri-tert.butylphenol
2,2'-methylene-bis-(4-methyl-6-tert.butylphenol)
2,2'-thio-bis-(4-methyl-6-tert.butylphenol)
4,4'-thio-bis-(3-methyl-6-tert.butylphenol)
4,4'-butylidene-bis-(6-tert.butyl-3-methylphenol)
Styrenated phenol
Butylated octylated phenol
Butylated α-methylstyrenated phenol
Styrenated butylated m, p-cresol
4,4'-methylenebis(2,6-di-tert.butylphenol)
2,2'-methylenebis[4-methyl-6-(1-methylcyclohexyl)-phenol]
Butylated reaction product of p-cresol and dicyclopentadiene
Tetrakis[methylene 3-(3,5-di-tert.butyl-4-hydroxyphenyl)propionate]methane
1,3,5-trimethyl-2,4,6-tris(3,5-di-tert.butyl-4-hydroxybenzyl)benzene
Thiodiethylenebis[3-(3,5-di-tert.butyl-4-hydroxyphenyl)propionate]
Octadecyl 3-(3,5-di-tert.butyl-4-hydroxyphenyl)propionate.

The compounds of the present invention have as one of their characteristic properties the ability to vastly improve the effect of numerous compounds which are presently used as antioxidants for organic materials. Thus, while the compounds of the present invention may be considered as stabilizers in their own right, their properties are such that they would be more conventionally classified as "synergists", in that, when combined with known phenolic stabilizers they exhibit the ability to increase stabilization to a degree far exceeding that which would be expected from the additive properties of the individual components.

The compounds represented by the general formula (I) may comprise from 10 to 90 percent of the antioxidant system, however, the maximum effectiveness of the antioxidant system is achieved when a compound represented by the formula (I) is combined with a phenolic antioxidant at ratios varying from 1:4 to 4:1. The optimum ratio of a given combination varies depending on the organic material to which it is added.

The antioxidant system according to the present invention can be added to said organic materials in various ways. For instance, it can be applied either after dilution with a solvent or directly as it is. Addition of the present antioxidant system to the organic material can be performed either by applying a mixture prepared in advance (said phenolic antioxidant with the compounds specified in the present invention) or by applying these ingredients individually. Mixing of the present antioxidant system with substances such as resins, plastics and rubbers, which are solid at room temperatures can be readily performed by means of conventional equipment, such as, mixers, kneaders and roll mills.

It has been found that addition of the antioxidant system of this invention to organic materials in the range from 0.1 to 5.0 parts per hundred of organic material by weight will effectively protect the organic material from deterioration.

As described above, the antioxidant system according to the present invention comprises the novel compound expressed by the general formula I combined with a known phenolic antioxidant. The antioxidant system of the present invention demonstrates antioxidative activity superior to that of most conventional antioxidant systems prepared by combining two or more commercial antioxidants.

BEST MODE FOR CARRYING OUT THE INVENTION

The compounds of the invention where R is equal to R' may be prepared by a base catalyzed reaction of two moles of a mercaptan, RSH, with epichlorohydrin. The resulting 1,3-di-(alkylthio)-2-propanol may be esterified by treatment with an acid chloride derived from an α-β unsaturated carboxylic acid,

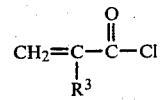

in the presence of an acid acceptor. The synthesis is completed by the base catalyzed addition of a mercaptan, $R^2SH$, to the unsaturated ester.

The preferred solvents for these reactions are the lower alcohols, such as ethanol and 2-propanol, for the first and third steps and ethers; such as diethyl ether or tetrahydrofuran, for the second step. Alkali metal hydroxides, such as sodium or potassium hydroxides, are the preferred bases for the first step; tertiary alkyl amines, such as triethylamine, are the preferred acid acceptors in the second step; and either quaternary ammonium hydroxides, such as benzyltrimethylammonium hydroxide, or alkali metal hydroxides are preferred bases for the third step.

The compounds of this invention where R is not the same as R' may be prepared by reacting a mercaptan, RSH, with an excess of epichlorohydrin in the presence of an equivalent amount of an alkali metal hydroxide. The alkylthiomethyloxirane obtained from this reaction may then be reacted with a second mercaptan, R'SH, using a lower alcohol as the solvent and an alkali metal hydroxide as the catalyst. The product of this reaction is an unsymmetrical 1,3-bis(alkylthio)-2-propanol, which may be converted to a compound of this invention by the procedures described in the preceding paragraph.

The following examples are presented for illustration and not limitation.

EXAMPLE 1

Preparation of 1,3-bis-(dodecylthio)-2-propyl 3-(dodecylthio)propionate (1) To a solution of 3.5 grams of potassium hydroxide and 20.2 grams of dodecanethiol in 50 milliliters of ethanol was added dropwise 4.63 grams of epichlorohydrin. The addition was accomplished in 5 minutes, during which the temperature of the reaction mixture rose from 26° C. to 66° C. The mixture was stirred at ambient temperature for 3 hours and was then poured into a large volume of water. The solid which precipitated was filtered off and allowed to dry. The yield of 1,3-bis(dodecylthio)-2-propanol weighed 23.5 grams and the compound melted at 40°–42° C.

(2) The 1,3-bis(dodecylthio)-2-propanol from Step (1) was dissolved in 75 milliliters of tetrahydrofuran. To this solution there was added 10.1 grams of triethylamine and then, dropwise, 5.0 grams of acryloyl chloride. The acid chloride addition was completed in 10 minutes during which the temperature rose from 21° C. to 53° C. The reaction mixture was stirred for 6 hours at ambient temperature and was then poured into water. The organic layer was separated and stripped of solvent on a rotary evaporator. There remained 24.0 grams of a pale yellow oil which was characterized as 1,3-bis-(dodecylthio)-2-propyl acrylate by means of its NMR spectrum.

(3) A solution of 23.0 grams of 1,3-bis(dodecylthio)-2-propyl acrylate, 9.05 grams of dodecanethiol and 1 milliliter of "Triton B" in 75 milliliters of ethanol was heated under reflux for 6 hours. The reaction mixture was allowed to cool and was then poured into a solution of 5 milliliters of concentrated hydrochloric acid in 300 milliliters of water. The light colored oil which precipitated crystallized on stirring and the crystalline solid was filtered off and allowed to dry. The product, 1,3-bis(dodecylthio)-2-propyl 3-(dodecylthio)propionate, weighed 31.5 grams and melted at 31°–32° C.

EXAMPLE 2

Preparation of 1,3-bis-(tert.-dodecylthio)-2-propyl 3-(tert.dodecylthio)propionate Substitution of tert.-dodecanethiol for n-dodecanethiol in the procedures described in Example 1 resulted in the formation of 1,3-bis(tert-dodecylthio)-2-propanol (from Step 1), 1,3-bis-(tert.-dodecylthio)-2-propyl acrylate (from Step 2) and finally 1,3-bis-(tert.-dodecylthio)-2-propyl 3-(tert.-dodecylthio)propionate. All three compounds are light colored, free flowing oils which were characterized by means of their NMR spectra.

EXAMPLE 3

Preparation of 1,3-bis-(phenylthio)-2-propyl 3-(phenylthio)propionate 1,3-bis(phenylthio)-2-propyl acrylate was prepared by using benzenethiol in place of dodecanethiol in the procedures described in Steps (1) and (2) of Example 1. A solution of 15 grams of the acrylate, 5 grams of benzenethiol, and 1 milliliter of "Triton B" in 75 millilters of ethanol was heated under reflux for 5½ hours. The reaction mixture was allowed to cool and was then poured into water. The oil which precipitated was separated by extraction with toluene. The toluene solution was stripped of solvent on a rotary evaporator leaving 19.8 grams of 1,3-bis-(phenylthio)-2-propyl 3-(phenylthio)propionate which was identified by means of its NMR spectrum.

EXAMPLE 4

Preparation of 1,3-bis-(phenylthio)-2-propyl 3-(dodecylthio)propionate

A solution of 15 grams of 1,3-bis-(phenylthio)-2-propyl acrylate, 9.2 grams of dodecanethiol, and 1 milliliter of "Triton B" in 75 milliliters of ethanol was heated under reflux for 5¾ hours. The reaction mixture was allowed to cool and was then poured into water. The oil which precipitated was separated by extraction with toluene and the toluene solution was stripped on a rotary evaporator. There remained 24.0 grams of a light colored oil which was identified as 1,3-bis-(phenylthio)-2-propyl 3-(dodecylthio)propionate by means of its NMR spectrum.

EXAMPLE 5

Preparation of 1,3-bis-(benzylthio)-2-propyl 3-(benzylthio)propionate 1,3-bis-(benzylthio)-2-propyl acrylate was prepared by using benzyl mercaptan in place of dodecanethiol in the procedure described in Steps (1) and (2) of Example 1. A solution of 14 grams of the acrylate, 5.8 grams of benzyl mercaptan and 1 milliliter of "Triton B" in 75 milliliters of ethanol was heated under reflux for 7¼ hours. The reaction mixture was allowed to cool and was then poured into water. The oil which precipitated was separated by extraction with toluene and the toluene solution was stripped on a rotary evaporator. There remained 21.0 grams of a light colored oil which was identified as 1,3-bis-(benzylthio)-2-propyl 3-(benzylthio)propionate by means of its NMR spectrum.

EXAMPLE 6

Preparation of 1,3-bis-(benzylthio)-2-propyl 3-(dodecylthio)propionate

A solution of 16.5 grams of 1,3-bis-(benzylthio)-2-propyl acrylate, 9.45 grams of dodecanethiol, and 1 milliliter of "Triton B" in 75 milliliters of ethanol was heated under reflux for 11 hours. The reaction mixture was allowed to cool and was then poured into water. The oil which precipitated was separated by extraction with hexane and the hexane solution was stripped on a rotary evaporator. The residue, which weighed 22.5 grams, was identified as 1,3-bis-(benzylthio)-2-propyl 3-(dodecylthio)propionate by means of its NMR spectrum.

Testing of Compounds of Structural Formula I

The antioxidative activity of the compounds and mixtures of this invention was determined by means of the oxygen absorption test. The testing procedure is of the type described in detail in *Industrial and Engineering Chemistry*, Vol. 43, Pages 4, 5 and 6 [1951] and *Industrial and Engineering Chemistry*, Vol. 45, Page 392 [1953]. A mixture of 0.5 parts of each compound and 0.5 parts of Wingstay T (Tradename of The Goodyear Tire & Rubber Company for butylated octyl phenols) was added to 100 parts of SBR-1006 and oxygen absorption measurements were made on the samples at 100° C. In addition, each compound and Wingstay T was added individually to SBR-1006 at a concentration of 0.5 parts per hundred and these samples were tested in the same way.

The data obtained from these test were used to calculate the synergistic effect (SE). This quantity is defined by G. Scott on page 205 of "Atmospheric Oxidation and Antioxidants", Elsevier Publishing Co., 1965, as:

$$SE = \frac{M - (a + b)}{a + b} \times 100$$

where M equals the activity of the mixture; "a" equals the activity of component "a" and "b" equals the activity of component "b". The time, in hours, required for each sample to absorb 1 percent oxygen by weight and the calculated SE values are listed in Table I below.

TABLE I

Synergistic Activity of the Compounds of this Invention

| Synergist From | Hours to 1% Oxygen Absorbed | | | SE |
|---|---|---|---|---|
| | Synergist Alone At 0.5 pph | Additive + 0.5 pph | Wingstay T 0.5 pph | |
| Example 1 | 24 | | 690 | 139 |
| 2 | 31 | | 582 | 93 |
| 3 | 53 | | 512 | 61 |
| 4 | 31 | | 767 | 159 |
| 5 | 29 | | 645 | 119 |
| 6 | 30 | | 589 | 100 |
| Wingstay T** | 265 | | | |
| DLTDP* | 48 | | 498 | 90 |
| Wingstay T** | 214 | | | |

*Dilauryl 3,3'-thiodipropionate - The most widely used commercial synergist.
**Tradename of The Goodyear Tire & Rubber Company for butylated octyl phenol.

Had no antioxidant been present in the SBR-1006, the SBR-1006 would have absorbed 1 percent oxygen in 5 to 10 hours. Table I demonstrates that the compounds of this invention are much more effective than the well-known synergist, DLTDP, which is now the synergist of choice in the industry.

In addition, two of the experimental products were evaluated as secondary antioxidants in polypropylene (Profax 6501). They were evaluated alone and in combination with a primary antioxidant, Irganox 1010. Plastanox STDP (distearylthiodipropionate) was used as a commercial secondary antioxidant control.

Each secondary antioxidant was evaluated alone at 0.10 pph and in a 0.05/0.05 pph blend with Irganox 1010. Irganox 1010 was also compounded alone at 0.05 and 0.10 pph concentration to establish its performance without a synergist.

The secondary antioxidants failed to provide significant antioxidant protection when used alone. However, both of the secondary antioxidants exhibit synergism with Irganox 1010.

Synergistic activity of the compounds of this invention was determined by means of the circulating hot oven test. This testing procedure is one commonly employed in the industry and was conducted using the products from examples 1 and 4.

Products from examples 1 and 4 were evaluated alone and in combination with Irganox 1010.

The testing procedure consists of dissolving the compound or compounds in a suitable solvent such as toluene. The solution was deposited on a commercially available and unstabilized polypropylene, known as Profax 6501 TM, at a concentration of 0.10 pph if evaluated alone and in a concentration of 0.05/0.05 pph blend by weight when evaluated with Irganox 1010. The materials were blended with a Henschel blender until all the solvent had evaporated. The stabilized resin was then injection molded to form a dumbbell shaped test specimen using appropriate injection molding conditions.

The resulting test specimens were then oven-aged in triplicate at 140° C. in a circulating hot air oven and observed daily. The first signs of degradation that were noted is crazing. The failure point was embrittlement to flexing, that is bending by hand to less than 90° C. The following Table II sets out the data collected.

TABLE II

Synergistic Activity In Polypropylene

| Synergist From | Days To Crazing | | Days To Failure | |
|---|---|---|---|---|
| | Additive 0.10 pph | Add. + Irg. 1010 0.05 + 0.05 pph | Additive 0.10 pph | Add. + Irg. 1010 0.05 + 0.05 pph |
| Example 1 | 1 | 54 | 1 | 55 |
| Example 4 | 1 | 48 | 1 | 49 |
| Plastanox STDP TM | 2 | 60 | 2 | 60 |
| Irganox 1010 0.05 pph | 21 | — | 23 | — |

From Table II it is evident that the products of Examples 1 and 4 of this invention exhibit synergistic activity.

Industrial Applicability

From the test data obtained, it is evident that the compounds disclosed herein significantly enhance the stability of SBR 1006 and polypropylene when combined with a known phenolic antioxidant. The industrial applications are readily apparent in light of the high synergistic activity of these novel compounds when used in conjunction with known phenolic antioxidants. Use of the compounds of this invention would significantly reduce the amount of costly phenolic antioxidant that is needed to provide the desired stability of the organic material. In addition, the use of these novel antioxidant systems would lessen the undesirable effects of color formation and discoloration.

While certain representative embodiments and details have been shown for the purpose of illustrating the invention it will be apparent to those skilled in this art that various changes and modifications may be made herein without departing from the scope of this invention.

I claim:
1. A compound of the formula:

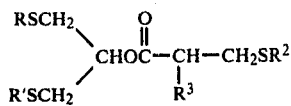 (I)

wherein R, R' and R² are alkyl radicals having 1 to 20 carbon atoms, phenyl radicals which may be substituted by 1 or 2 alkyl groups having 1 to 8 carbon atoms, aralkyl radicals having 7 to 12 carbon atoms or cycloalkyl radicals having 5 to 12 carbon atoms and R³ is hydrogen or an alkyl radical having 1 to 4 carbon atoms.

2. A compound according to claim 1 wherein R and R' are dodecyl or phenyl and R² is dodecyl.

3. A compound according to claim 1 wherein R, R' and R² are alkyl radicals having from 8 to 20 carbon atoms.

4. A compound according to claim 1 wherein R and R' are phenyl radicals which may be substituted by one or two alkyl radicals having from 1 to 8 carbon atoms and R² is an alkyl radical having from 8 to 20 carbon atoms.

5. A compound according to claim 1 wherein R and R' are phenyl radicals and R² is a dodecyl radical.

* * * * *